United States Patent
Ruprecht et al.

(10) Patent No.: US 10,974,753 B2
(45) Date of Patent: Apr. 13, 2021

(54) STROLLER COMFORT DEVICE, STROLLER UNDERFRAME AND STROLLER

(71) Applicant: Robert Bosch GmbH, Stuttgart (DE)

(72) Inventors: Ester Ruprecht, Offenburg (DE); Pierre Nonnenmacher, Minversheim (FR)

(73) Assignee: Robert Bosch GmbH, Stuttgart (DE)

(*) Notice: Subject to any disclaimer, the term of this patent is extended or adjusted under 35 U.S.C. 154(b) by 155 days.

(21) Appl. No.: 16/312,008

(22) PCT Filed: Jun. 22, 2017

(86) PCT No.: PCT/EP2017/065420
§ 371 (c)(1),
(2) Date: Dec. 20, 2018

(87) PCT Pub. No.: WO2018/001864
PCT Pub. Date: Jan. 4, 2018

(65) Prior Publication Data
US 2019/0329808 A1    Oct. 31, 2019

(30) Foreign Application Priority Data
Jun. 30, 2016 (DE) ............... 10 2016 211 916.8

(51) Int. Cl.
*B62B 5/04* (2006.01)
*B62B 5/00* (2006.01)
(Continued)

(52) U.S. Cl.
CPC ............ *B62B 5/004* (2013.01); *B62B 5/0076* (2013.01); *B62B 9/005* (2013.01); *B62B 9/22* (2013.01)

(58) Field of Classification Search
CPC ....... B62B 5/004; B62B 5/0076; B62B 9/005; B62B 9/22
See application file for complete search history.

(56) References Cited

U.S. PATENT DOCUMENTS

| | | | |
|---|---|---|---|
| 6,360,836 B1 | 3/2002 | Milano, Jr. et al. | |
| 2013/0162396 A1* | 6/2013 | Yang | B62B 9/00 340/5.81 |
| 2016/0009169 A1 | 1/2016 | Biderman et al. | |

FOREIGN PATENT DOCUMENTS

| | | |
|---|---|---|
| CN | 202896636 U | 4/2013 |
| CN | 103786608 A | 5/2014 |

(Continued)

OTHER PUBLICATIONS

International Search Report for Application No. PCT/EP2017/065420 dated Oct. 17, 2017 (English Translation, 3 pages).

*Primary Examiner* — John D Walters
*Assistant Examiner* — James J Triggs
(74) *Attorney, Agent, or Firm* — Michael Best & Friedrich LLP

(57) ABSTRACT

The invention relates to a pram comfort device (10, 12) for a pram, in particular a pram axle and/or a pram wheel (12), with an axle and/or a wheel (200), wherein the axle is designed as what is referred to as an intelligent axle and/or the wheel (200) is designed as what is referred to as an intelligent wheel (200), and an additional comfort function can be provided for the pram by means of the axle and/or by means of the wheel (200). Furthermore, the invention relates to a pram underframe or a pram, wherein the pram underframe or the pram has a pram comfort device (10, 12) according to the invention.

21 Claims, 1 Drawing Sheet

(51) Int. Cl.
*B62B 9/00* (2006.01)
*B62B 9/22* (2006.01)

(56) References Cited

FOREIGN PATENT DOCUMENTS

| | | |
|---|---|---|
| CN | 204256893 U | 4/2015 |
| CN | 204360527 U | 5/2015 |
| CN | 105007458 A | 10/2015 |
| DE | 7222327 | 12/1972 |
| DE | 19750441 | 6/1999 |
| DE | 20007416 | 6/2001 |
| DE | 102004001015 | 10/2005 |
| DE | 202005015070 | 12/2005 |
| DE | 102006005227 | 6/2007 |
| DE | 202007010454 | 12/2007 |
| DE | 102011114337 | 3/2013 |
| DE | 102013216679 | 2/2015 |
| DE | 102013224885 | 6/2015 |
| EP | 2581297 | 4/2013 |
| EP | 2818382 | 12/2014 |
| FR | 2688181 | 9/1993 |
| WO | 2010028235 | 3/2010 |
| WO | 2015107713 A1 | 7/2015 |

\* cited by examiner

STROLLER COMFORT DEVICE, STROLLER UNDERFRAME AND STROLLER

BACKGROUND OF THE INVENTION

The invention concerns a stroller comfort device for a stroller, in particular a stroller axle and/or a stroller wheel, with an axle and/or a wheel. The invention further concerns a stroller underframe and a stroller, each with a respective stroller comfort device according to the invention.

In the prior art, strollers for manual pushing with at least one place to lie and/or a place to sit are known, wherein the stroller is designed in such a way that it can be pushed by an adolescent or adult person (operator). In this case it is preferred that a baby or a child in the stroller is within a field of view of the pushing person, in particular with their face in view. Pushing the stroller on upslopes, in snow, on uneven ground etc. sometimes requires significantly increased physical exertion, so that strollers are increasingly being fitted with an electromotive drive that makes it easier for the person that is pushing to push the stroller relatively easily even in the event of an increased counter force.

DE 10 2013 216 679 A1 discloses a stroller with a frame, a plurality of wheels attached to the frame, an axle connected to at least one of the wheels, a first force transfer wheel disposed on the axle and a drive module. The drive module comprises a second force transfer wheel, an electric motor driving the second force transfer wheel and a battery supplying the electric motor. The drive module can be mounted on the frame and can be removed from the frame, wherein in the mounted state the two force transfer wheels are connected to each other in a positive locking or frictional manner. The electric motor can be actuated by means of electronics by using a control unit that can be operated by means of an operating unit.

SUMMARY OF THE INVENTION

It is an object of the invention to specify an improved stroller. In doing so, the stroller is intended to have an increased range of functions compared to the prior art and to make it easier for an operator to use. Further, the active and/or passive safety of the operator, a baby or child in the stroller and/or a third person is intended to be enhanced. Further, the stroller according to the invention is intended to be of simple construction and inexpensive to manufacture, assemble and maintain.

The object of the invention is achieved by means of a stroller comfort device for a stroller, in particular a stroller axle and/or a stroller wheel, with an axle and/or a wheel; and by means of a stroller underframe or a stroller with a stroller comfort device; according to the independent claims.— Advantageous developments, additional features and/or advantages of the invention arise from the dependent claims and the following description.

The stroller comfort device according to the invention comprises an axle that is embodied as a (so-called) intelligent axle and/or a wheel that is embodied as a (so-called) intelligent wheel, wherein additional comfort functionality can be provided for the stroller by means of the axle and/or by means of the wheel. Additional comfort functionality means a function of the stroller that can be fulfilled by means of the axle and/or by means of the wheel for a baby, a child or an operator that is travelling with the stroller in addition to a conventional task of the axle and/or the wheel. In doing so, the additional comfort functionality makes operation of the stroller easier, can increase passive and/or active safety etc.

A wheel comprises at least one wheel body that is fixed to the stroller or that can be rotated on the stroller, wherein the stroller can be directly supported on the ground and placed so as to be able to roll with the wheel. Here the wheel preferably comprises one or preferably two wheel bodies and may comprise a tire on the respective wheel body consisting of for example rubber, plastic etc. that is fixed to the wheel body or that is rotatable relative to the wheel body. The stroller itself preferably comprises three or preferably four such wheels. I.e., according to the nomenclature of the invention, a stroller comprises exactly one wheel at a support point, possibly with a number of wheel bodies, each preferably with a tire.

An axle means at least one axle that is fixed to the stroller or that is rotatable on the stroller, by means of which the stroller can be indirectly supported on the ground and can be placed so as to roll. The stroller itself preferably comprises one or preferably two such axles. I.e., according to the nomenclature of the invention, a stroller comprises a single axle for two support points or wheels.—According to the invention, the additional comfort functionality can be provided on/in only one axle and/or on/in only one wheel body or wheel.

The axle and/or the wheel can be embodied in such a way that, apart from a power supply and/or an operating unit, the additional comfort functionality can be mainly or essentially exclusively provided by means of the axle and/or exclusively by means of the wheel. I.e., the performance or setting up of the additional comfort functionality is carried out, apart from once by the power supply (optional) and/or the operating unit for activating and deactivating the additional comfort functionality, mainly or essentially exclusively by the axle and/or mainly or essentially exclusively by the wheel.

Furthermore, the comfort functionality can be provided by means of the axle and/or by means of the wheel apart from a sub functionality or a functionality for an assistance device of the stroller. An assistance device of this type concerns the stroller preferably on its own or as a whole, wherein an assistance device of this type can be embodied as a pushing assistance arrangement (cf. cited document in the prior art) or as a braking assistance arrangement, for example.—The comfort functionality for the stroller can be an electrical comfort functionality, an electromechanical comfort functionality, an electronic comfort functionality and/or a transmitter/receiver comfort functionality.

According to the invention, the axle and/or the wheel can comprise a stroller comfort element, by means of which the comfort functionality for the stroller can be provided. The stroller comfort element can be arranged so that the element can be operated by means of an HMI interface (see below), an operating unit that is fixed to the stroller and/or an external operating unit, in particular a smartphone, a tablet computer, a remote control or an auxiliary device.—According to the invention, the axle and/or the wheel can comprise an electromechanical drive. An automatic rocking function or an automatic driving function of the stroller can be implemented by means of the drive, for example.

According to the invention, the stroller comfort element can comprise an illumination device. By means of the illumination device, for example a path illumination device and/or a carriage illumination device, for example a path ahead (passive and active safety, path illumination device) or the ground (passive safety, stroller illumination device) can be illuminated. Further, the stroller comfort element can comprise a sensor or detector, in particular a light sensor. Automatic illumination or an automatic driving function of the stroller can be implemented by means of the light sensor, for example. Furthermore, the stroller comfort element can comprise a microphone. This enables a baby phone function to be achieved for example.

Moreover, the stroller comfort element can comprise an HMI interface (HMI: Human Machine Interface, man-machine interface). By means of the HMI interface, a predefined motion can be imposed on the stroller and on the axle and/or the wheel of the stroller comfort element for example, which represents a certain further behavior, for example a rocking function of the stroller. This may be triggered or turned on/off by the HMI interface or by means of the preferably external operating unit. The HMI interface that is integrated within the stroller comfort device carries out the functionality of an intuitive operating unit.

According to the invention, the stroller comfort element can comprise electronics. This enables at least one additional comfort functionality to be implemented simply. Further, the stroller comfort element can comprise an alarm device. By means of the alarm device, for example depending on information, for example from a sensitive mat, an alarm can be implemented acoustically, optically or by a preferably rapid motion, for example a shaking motion of the stroller that can be implemented by means of the drive.

Moreover, the stroller comfort element can comprise an interface for a wireless data transmission by means of radio technology. An interface of this type is a Bluetooth interface, for example. Furthermore, the stroller comfort element can comprise a transmitter/receiver. This enables, for example, signals from the light sensor, from the microphone, from the HMI interface, from the electronics, from the alarm device, from the sensitive mat etc. to be received (and forwarded) or, vice-versa, (to be obtained and) transmitted to said device or devices.

The stroller comfort element can be arranged so that the illumination device thereof (path illumination device and/or a stroller illumination device) can be switched on if the ambient light intensity falls below a certain value, the stroller moves, the operator has at least one hand on a pushing handle of the stroller and/or the illumination device is switched on by means of the HMI interface/operating unit.

Thus for example, the path illumination device can be switched on if: 1. an ambient light intensity falls below a certain value and the stroller is moving, or 2. a request to the stroller comfort device is made by means of the HMI interface, or 3. the path illumination device is switched on by means of the preferably external operating unit. Further, for example the stroller illumination device can be switched on if: 1. an ambient light intensity falls below a certain value, or 2. a request to the stroller comfort device is made by means of the HMI interface, or 3. the carriage illumination device is switched on by means of the preferably external operating unit.

The stroller comfort device can further be arranged so that a or the electromechanical drive is set into operation by the light sensor if excessive solar radiation is acting on a baby or child that is disposed in the stroller, a corresponding request is made to the stroller comfort device by means of the HMI interface and/or a rocking function in the stroller is to be started.

The stroller comfort device can be supplied with electrical energy from a battery or an accumulator, wherein the battery or the accumulator is provided on/in the stroller comfort element or can be provided on/in the stroller.—The stroller underframe or the stroller can comprise an assistance device, in particular a pushing assistance arrangement and/or a braking assistance arrangement. The stroller comfort device is preferably embodied as a stroller rear axle, as a stroller rear wheel or as a combined stroller rear axle-rear wheel; which however can be used on a front axle and/or a front wheel. The stroller underframe or the stroller can be without an operating unit that is fixed to the stroller. Further, the stroller can comprise a sensitive mat.—The advantages of the invention lie in the possible new functions and/the activation strategy thereof.

One implementation of the invention consists for example of not requiring an operating unit on the stroller, i.e. the operating unit that is fixed to the stroller is omitted. In this case, the stroller comfort element of the stroller comfort device is arranged to be able to be operated possibly exclusively by the HMI interface, or possibly exclusively by the external operating unit. The at least one comfort function may thus be exclusively activated by means of the HMI interface or by means of the external operating unit. Thus for example, the HMI interface is used both for activating and implementing a comfort function. A combination of said two features can of course be used.

For example, a two-time (short and/or rapid) motion of the stroller forwards and backwards means that the movement is to be repeated (begin the movement) until for example a two-time (short and/or rapid) motion forwards and backwards is detected again (end the movement that is to be repeated). Thus for example, the rocking function or even other movements of the entire stroller or even only of sections or parts of the stroller is/are implemented. For example, by moving the stroller once forward to the left, then possibly back, then once forward to the right, the comfort function can activate the prevention of excessive solar radiation. This can be additionally supported by a defined light pattern on the light sensor as already described above.

With a comfort function predefined in such a way, once an operator actively touches the stroller (activation, deactivation and/or changing (the amplitude, frequency, intensity etc.) of the comfort function), accelerates the stroller (activation and/or changing (the amplitude, frequency, intensity etc.) of the comfort function) and/or brakes the stroller (deactivation and/or changing (amplitude, frequency, intensity etc.) of the comfort function), this is detected by the HMI interface and thus the comfort function is activated, deactivated or changed (amplitude, frequency, intensity etc.). This is preferably the detection of an intervention by the sensor that is provided on/in the wheel with the HMI interface or even as the HMI interface.

Further, the stroller comfort element of the stroller comfort device can be arranged such that that the illumination device thereof can be switched on if an ambient light intensity falls below a certain value and/or the stroller moves, for example. Here we can differentiate between path illumination (forward illumination) and stroller illumination (for example illumination of the ground under the stroller itself or of the stroller as a position light in order to be seen). If for example the ambient light intensity falls below a certain value and the stroller is moving, then the path illumination and the stroller illumination are activated. On the other hand, if only the ambient light intensity falls and the stroller is stationary, then it is possible to only activate the stroller illumination, for example.

BRIEF DESCRIPTION OF THE DRAWINGS

The invention is described in detail below using exemplary embodiments while referring to the accompanying schematic and not-to-scale drawing. Sections, elements, components, units, schematics and/or components comprising an identical, univocal or similar design and/or function are characterized with the same reference characters in the description of the figures (see below), the claims and in the figures (figs.) of the drawing. With the invention, a feature can be arranged positively, i.e. present, or negatively, i.e. absent, wherein a negative feature is not explicitly described as a feature if no value is placed on the fact that it is absent.

A feature (section, element, component, unit, schema, component etc.) of this specification (description (description of the invention (see above), description of the figures), claims, drawing) can not only be used in a specified way, but also in another way (in isolation, in combination, as a replacement, as an addition, separately, by omission etc.). In particular, it is possible, using a reference character and a feature associated therewith, or vice versa, in the description, the claims and/or the drawing, to replace, add or omit a feature in the claims and/or the description. Moreover, a feature in a claim can be designed and/or specified in detail as a result.

Figure 1:
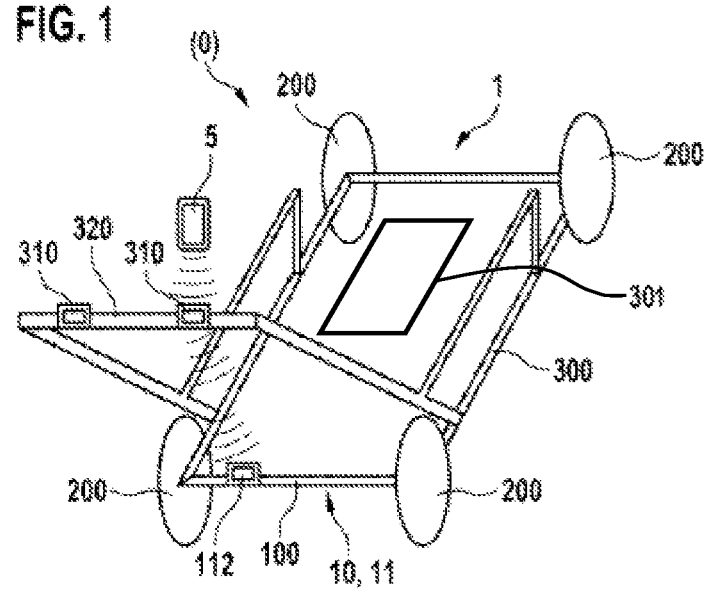
Figure 2:
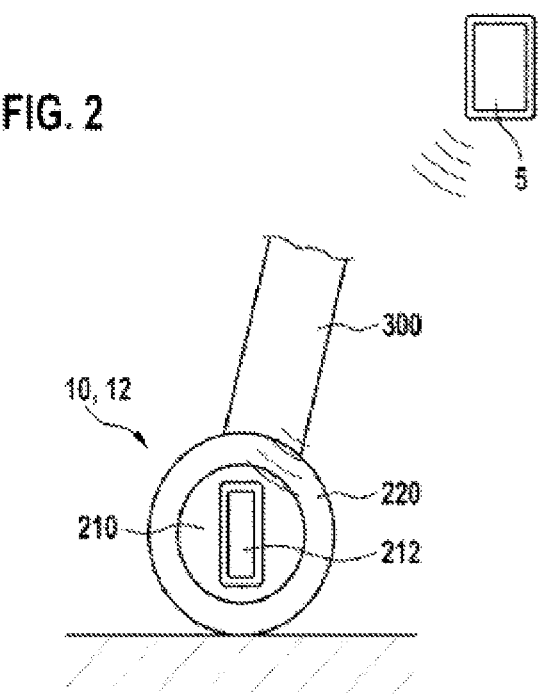

The features of this specification (apart from the (mainly unknown) prior art) can also be interpreted as optional features; i.e. each feature can be perceived as an optional, arbitrary or preferred, i.e. not a mandatory, feature. Thus, the removal of a feature, possibly including the periphery thereof, from an exemplary embodiment is possible, wherein said feature can then be transferred to a generalized concept of the invention. The lack of a feature (negative feature) in an exemplary embodiment indicates that the feature is optional in relation to the invention. Further, a term relating to the type of a feature can also be considered to be a generic term for the feature (with possibly further hierarchical structuring into subgenus, section etc.), whereby a generalization of a feature or said feature is possible, for example with a consideration of equal effect and/or equivalency.—In the figures, only by way of example:

FIG. 1 shows an underframe according to the invention for a stroller according to the invention with a first embodiment of a stroller comfort device according to the invention in a three-dimensional view from the perspective of an operator; and FIG. 2 shows a second embodiment of a stroller comfort device according to the invention in a front or rear side view that is cut off at the top.

DETAILED DESCRIPTION

The invention is described in detail below using exemplary implementations of two embodiments of a stroller comfort device. The invention is however not limited to such embodiments and/or the exemplary embodiments described below, but is of a more fundamental nature, so that it can be used for all strollers (classic stroller, sports buggy, combi-stroller, buggy, multi-seat buggy, stroller with a pedal function, special strollers (twins, rehab etc.) etc.) within the scope of the invention.—Although the invention is described and illustrated in detail by preferred exemplary embodiments, the invention is not limited by the disclosed exemplary embodiments. Other variations can be derived therefrom without departing from the protective scope of the invention.

FIG. 1 shows a stroller underframe 1 for a stroller 0 with at least one place to lie and/or a place to sit. The stroller underframe 1 comprises a frame 300 and a plurality of wheels 200 provided on the frame 300. In particular, three or four wheels 200 are provided on the frame. The frame 300 acts as a receptacle for a pan or a seat in which a baby or a child can be transported. At least one of the wheels 200 is preferably connected to an axle 100. In particular, this is preferably the rear axle 100 of the stroller 0. There is preferably a respective wheel 200 disposed on each end of the axle 100.

An axle 100 is provided that is fixed to the stroller, fixed to the frame or rotatable on the stroller or frame 300. A wheel 200, see FIG. 2, comprises at least one wheel body 210 that is fixed to the stroller, fixed to the frame or fixed to the axle, or rotatable on the stroller 1, rotatable on the frame 300 or rotatable on the axle 100. The wheel body 210 preferably comprises a tire 220, for example consisting of rubber, plastic etc. The tire 220 can be provided fixed to the wheel body or rotatable on the wheel body 210.—Depending on an exemplary embodiment of the stroller 0, the axle 100, the wheel 200, the wheel body 210 and/or the tire 220 is or are embodied to be driven electromotively.

According to the first embodiment of the invention, at least one axle 100 is embodied as an intelligent stroller axle 10, 11 (stroller comfort device 10, 11), in particular an intelligent stroller rear axle 10, 11, which is shown in FIG. 1. According to the second embodiment of the invention, at least one wheel 200 is embodied as an intelligent stroller wheel 10, 12 (smart wheel) stroller comfort device (10, 12), in particular an intelligent stroller rear wheel 10, 12, which is shown in FIG. 2. In the case of the first embodiment, the stroller axle 10, 11 comprises a stroller comfort element 112 (within the axle) and in the case of the second embodiment, the stroller wheel 10, 12 comprises a stroller comfort element 212 (within the wheel).

The following embodiments mainly concerns the stroller comfort element 112, 212, wherein the stroller comfort element 112, 212 is either associated with the stroller axle 10, 11 and/or the stroller wheel 10, 12. The stroller comfort element 112, 212 is supplied with electrical energy by a preferably replaceable battery or a possibly replaceable accumulator, which can be provided as a component of the stroller comfort element 112, 212 or externally in relation to the stroller comfort element 112, 212 on/in the stroller 0 or the stroller comfort device 10, 11. Further, a supply with electrical energy that is already provided on/in the in the stroller 0 can also be tapped into. Solar powered operation may of course also be used.

Further, it is preferable that the stroller comfort element 112, 212 can be operated by means of an external operating unit 5, for example a smartphone 5, a tablet computer 5, a remote control 5, an auxiliary device 5 etc. This can also be carried out by means of an operating unit 310 that is fixed to the stroller. In this case, the operating unit 5, 310 can comprise a transmitter/receiver for wireless data transmission over short distances by means of radio technology, for example for a Bluetooth connection etc. Further, the operating unit 310 that is fixed to the stroller can also be arranged for cable data transmission.—The operating unit 310 that is fixed to the stroller that is shown in FIG. 1 can be omitted, so that the stroller comfort element 112, 212 can be operated by means of the external operating unit 5 or an HMI interface (see below).

According to the invention, a stroller 0 is improved by the integration of an intelligent stroller comfort device 10; 11, 12; 11/12, which provides at least one additional functionality for the stroller 0, for example by means of the integration of a sensor, a detector, electronics etc. in this case, the functionality according to the invention (see also above) or the functionalities according to the invention can be provided in addition to an electrical pushing assistance arrangement or a braking assistance arrangement.

It is thus possible, for example, to integrate ambient light intensity measurement by means of a light sensor within the stroller comfort device 10; 11, 12; 11/12 or the stroller comfort element 112, 212 thereof. Illumination with automatic switch-on in darkness (sensing by light sensor) and/or on detection of movement is then preferably integrated. In this case, the illumination can point in the direction of the path to be traversed (for example forwards) and/or towards the ground (to be seen).—Furthermore, a baby phone function with integrated microphone and for example a Bluetooth interface can be implemented. A corresponding message can be sent to the external operating unit 5, etc.

Further, shading from solar radiation on the baby or child disposed in the stroller 0 can be carried out by means of the light sensor. If the solar radiation is too high, the electromechanical drive of the axle 100 or the wheel 200 or the wheels 200 can be switched on, wherein the stroller 0 preferably carries out a circular movement such that the baby or child is no longer exposed to the high solar radiation. Activation can be carried out by a predefined shadow/light pattern on the light sensor, by operating the stroller (HMI interface (see also above)), for example by a predefined motion of the stroller 0, etc.

Further, according to the invention a rocking function can be implemented by means of the stroller comfort device 10; 11, 12; 11/12 or the stroller comfort element 112, 212 thereof. The rocking function can be implemented by automatic, brief forward and reverse movements of the stroller by means of at least one electromechanical drive. Two electromechanical drives are preferably used for this purpose. The rocking function can be activated for example by a trigger by means of the baby phone function (baby or child is crying), a pattern of movement applied to the stroller 0, which can be detected by the HMI interface, etc.

On detecting an externally generated pattern of movement of the stroller 0 by means of the HMI interface, there is the simple option of adjusting an amplitude of the rocking function (for example preset, analogous to the pattern of movement, analogous to an amplitude of the pattern of movement etc.). During the rocking function, predefined stroller patterns of movement can be reproduced automatically. Deactivation of the rocking function can for example be carried out by active manual braking of the motion of the stroller 0 (detecting the stroller 0 being touched).

Furthermore, the stroller 0 can be fitted with a sensitive mat 301 that is provided under the baby or the child. Data generated by the sensitive mat 301 can be acquired by means of the stroller comfort device 10; 11, 12; 11/12 or by the stroller comfort element 112, 212 thereof, for example via the Bluetooth interface. Based on said data, physiological data of the baby or child can be determined, for example by the electronics of the stroller comfort device 10; 11, 12; 11/12 or by the stroller-comfort element 112, 212 thereof.

For example, by analysis of data of a mechanical pressure on the sensitive mat 301, it can be determined whether the baby or the child is breathing normally. In this case, there is preferably again the option of automatic activation of the rocking function in the presence of certain physiological data. Further, there is preferably the option to output a warning or an alarm in the presence of threatening physiological data. For this purpose, the stroller comfort device 10; 11, 12; 11/12 or the stroller comfort element 112, 212 thereof preferably comprises an alarm device. Further, the warning or the alarm can alternatively or additionally be sent to the external operating unit 5.

According to the invention, the stroller comfort device 10; 11, 12; 11/12 according to the invention can be embodied as a stroller axle 11 according to the invention, as a stroller wheel 12 according to the invention, as a stroller axle 11 according to the invention with a conventional wheel 200, as a stroller wheel 12 according to the invention with a conventional axle 100 or as a stroller axle-stroller wheel 11/12. In this case, the invention (10; 11, 12; 11/12) can preferably be used on a rear axle 100 or a rear wheel 200. It is of course also possible to use the invention (10; 11, 12; 11/12) on a front axle 100 or a front wheel 200.

In general, the stroller 0, the stroller underframe 1, the stroller comfort device 10; 11, 12; 11/12, i.e. the (intelligent) stroller axle 11 and/or the (intelligent) stroller wheel 12, can be embodied in such a way that the relevant comfort function or the relevant comfort functions can be activated, deactivated and/or changed (amplitude, frequency, intensity etc.) on their own by the HMI interface, the external operating unit 5 or the operating unit 310 that is fixed to the stroller. In this case, the HMI interface, the external operating unit 5 and/or the operating unit 310 that is fixed to the stroller can be provided, wherein preferably at least the HMI interface is provided and in particular at least the HMI interface and the external operating unit 5 are provided.

What is claimed is:

1. A stroller comfort device (10; 11, 12; 11/12) for a stroller (0), having at least one of a stroller axle (11, 100) and a stroller wheel (12, 200),
   wherein the stroller comfort device (10; 11, 12; 11/12) comprises an alarm and a sensitive mat, and
   wherein the sensitive mat communicates with the alarm such that, in the presence of an input sensed by the sensitive mat, the alarm is activated to provide additional comfort functionality for the stroller (0).

2. The stroller comfort device (10; 11, 12; 11/12) as claimed in claim 1, further comprising a stroller comfort element (112, 212) including the at least one of the stroller axle (100) and the stroller wheel (200).

3. The stroller comfort device (10; 11, 12; 11/12) as claimed in claim 2, characterized in that the stroller comfort element (112, 212) is operated by at least one of an HMI interface, an external operating unit (5) and an operating unit (310) that is fixed to the stroller.

4. The stroller comfort device (10; 11, 12; 11/12) as claimed in claim 1, wherein the at least one of the stroller axle (100) and the stroller wheel (200) comprises an electromechanical drive.

5. The stroller comfort device (10; 11, 12; 11/12) as claimed in claim 2, characterized in that the stroller comfort element (112, 212) includes an illumination device configured to be switched on by an operating unit (5, 310) if at least one of the following conditions are met:
   an ambient light intensity falls below a certain value;
   a stroller (0) including the stroller comfort device (10; 11, 12; 11/12) is moving;
   a request to the stroller comfort element (112, 212) is made by the HMI interface; and
   an operator has at least one hand on a pushing handle (320) of the stroller (0).

6. The stroller comfort device (10; 11, 12; 11/12) as claimed in claim 4, characterized in that the electromechanical drive is set into operation if at least one of the following conditions are met:
   a light sensor measures a maximum level of solar radiation on a baby or child disposed in the stroller;
   a request is made to a stroller comfort element (112, 212) by an HMI interface; and a rocking function in a stroller (0) including the stroller comfort device (10; 11, 12; 11/12) is activated.

7. The stroller comfort device (10; 11, 12; 11/12) as claimed in claim 2, characterized in that the stroller comfort element (112, 212) can bois supplied with electrical energy from a battery or an accumulator, wherein the stroller comfort element (112, 212) or a stroller (0) having the stroller comfort device (10; 11, 12; 11/12) includes the battery of the accumulator.

8. A stroller (0) including the stroller comfort device (10; 11, 12; 11/12) as claimed in claim 1, characterized in that the stroller (0) includes a stroller underframe (1).

9. The stroller (0) according to claim 8, characterized in that the stroller underframe (1) or the stroller (0) includes at least one of:
an assistance device (2) including at least one of a pushing assistance arrangement (2) and a braking assistance arrangement (2);
a stroller rear axle (11);
a stroller rear wheel (12);
a combined stroller rear axle-rear wheel (11/12); and
an operating unit (310) is not fixed to the stroller.

10. The stroller comfort device (10; 11, 12; 11/12) as claimed in claim 2, wherein the stroller comfort element (112, 212) comprises an illumination device.

11. The stroller comfort device (10; 11, 12; 11/12) as claimed in claim 2, wherein the stroller comfort element (112, 212) comprises a light sensor.

12. The stroller comfort device (10; 11, 12; 11/12) as claimed in claim 2, wherein the stroller comfort element (112, 212) comprises a microphone.

13. The stroller comfort device (10; 11, 12; 11/12) as claimed in claim 2, wherein the stroller comfort element (112, 212) comprises an interface for wireless data transmission by means of radio technology.

14. The stroller comfort device (10; 11, 12; 11/12) as claimed in claim 2, wherein the stroller comfort element (112, 212) comprises a transmitter/receiver.

15. The stroller comfort device (10; 11, 12; 11/12) as claimed in claim 1, wherein the senstive mat is a pressure senstive mat configured to detect mechanical pressure from a baby or child on the pressure senstive mat.

16. A stroller comfort device (10; 11, 12; 11/12) for a stroller (0) having at least one of a stroller axle (11, 100) and a stroller wheel (12, 200),
wherein the stroller comfort device (10; 11, 12; 11/12) comprises a sensitive mat and an electromechanical drive configured to be connected to the at least one of a stroller axle (11, 100) and a stroller wheel (12, 200), and
wherein the sensitive mat communicates with the electromechanical drive such that, in the presence of an input sensed by the sensitive mat, the electromechanical drive is activated to perform a rocking function to provide additional comfort functionality to the stroller (0).

17. The stroller comfort device (10; 11, 12; 11/12) as claimed in claim 16, wherein the at least one of the stroller axle (100) and the stroller wheel (200) comprise(s) a stroller comfort element (112, 212) operated by at least one of an HMI interface, an external operating unit (5) and an operating unit (310) that is fixed to a stroller including the stroller comfort device (10; 11, 12; 11/12).

18. The stroller comfort device (10; 11, 12; 11/12) as claimed in claim 16, wherein the at least one of the stroller axle (100) and the stroller wheel (200) comprise(s) a stroller comfort element (112, 212) including an illumination device configured to be switched on by an operating unit (5, 310) if at least one of the following conditions are met:
an ambient light intensity falls below a certain value;
a stroller (0) including the stroller comfort device (10; 11, 12; 11/12) is moving;
a request to the stroller comfort element (112, 212) is made by an HMI interface; and
an operator has at least one hand on a pushing handle (320) of the stroller (0) including the stroller comfort device (10; 11, 12; 11/12).

19. The stroller comfort device (10; 11, 12; 11/12) as claimed in claim 16, wherein the electromechanical drive is set into operation if at least one of the following conditions are met:
a light sensor measures a maximum level of solar radiation on a baby or child disposed in the stroller;
a request is made to the stroller comfort element (112, 212) by an HMI interface; and
a rocking function of a stroller (0) including stroller comfort device (10; 11, 12; 11/12) is activated.

20. The stroller comfort device (10; 11, 12; 11/12) as claimed in claim 16, wherein the at least one of the stroller axle (100) and the stroller wheel (200) comprise(s) a stroller comfort element (112, 212) including an illumination device.

21. The stroller comfort device (10; 11, 12; 11/12) as claimed in claim 16, wherein the at least one of the stroller axle (100) and the stroller wheel (200) comprise(s) a stroller comfort element (112, 212) including an interface for wireless data transmission by means of radio technology.

* * * * *